(12) United States Patent
Bhatt et al.

(10) Patent No.: US 10,803,247 B2
(45) Date of Patent: Oct. 13, 2020

(54) INTELLIGENT CONTENT DETECTION

(71) Applicant: Hartford Fire Insurance Company, Hartford, CT (US)

(72) Inventors: Dhruv A. Bhatt, Matthews, NC (US); Nicole Lynn Sharp, Manchester, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 37 days.

(21) Appl. No.: 15/839,164

(22) Filed: Dec. 12, 2017

(65) Prior Publication Data

US 2019/0179895 A1    Jun. 13, 2019

(51) Int. Cl.
| | |
|---|---|
| G06F 40/30 | (2020.01) |
| G06Q 50/00 | (2012.01) |
| G06N 20/00 | (2019.01) |
| G06F 16/33 | (2019.01) |
| G06F 40/205 | (2020.01) |
| G06F 40/253 | (2020.01) |
| H04L 12/58 | (2006.01) |

(52) U.S. Cl.
CPC .......... *G06F 40/30* (2020.01); *G06F 16/3334* (2019.01); *G06F 40/205* (2020.01); *G06F 40/253* (2020.01); *G06N 20/00* (2019.01); *G06Q 50/01* (2013.01); *H04L 51/12* (2013.01)

(58) Field of Classification Search
CPC ... H04L 51/12; G06F 17/2785; G06F 17/2735
See application file for complete search history.

(56) References Cited

U.S. PATENT DOCUMENTS

| | | | |
|---|---|---|---|
| 6,782,510 B1 * | 8/2004 | Gross | G06F 17/274 |
| | | | 715/257 |
| 8,725,495 B2 | 5/2014 | Peng et al. | |
| 9,275,041 B2 | 3/2016 | Ghosh et al. | |
| 9,703,872 B2 * | 7/2017 | Spears | G06F 16/9535 |
| 2005/0204005 A1 * | 9/2005 | Purcell | G06Q 10/107 |
| | | | 709/206 |
| 2008/0134282 A1 * | 6/2008 | Fridman | G06Q 10/10 |
| | | | 726/1 |

(Continued)

*Primary Examiner* — Samuel G Neway
(74) *Attorney, Agent, or Firm* — Ference & Associates LLC

(57) ABSTRACT

Embodiments provide a method for detecting inappropriate content in user interactions, including: receiving an unstructured text-based input corresponding to a user interaction of a user; analyzing, using a text analytics technique, the text-based input to identify content within the input; determining whether at least a portion of the content within the input comprises inappropriate content by determining if the at least a portion of the content is categorized as inappropriate content; if the content is categorized as inappropriate content, identifying the content as inappropriate content; and if the content is not categorized as inappropriate content, receiving text-based input from other users, analyzing the text-based input from other users to determine a sentiment of the text-based input from other users, generating a content score for the content of the user, and identifying the content as inappropriate content if the content score meets or exceeds a predetermined threshold; and performing an action.

20 Claims, 4 Drawing Sheets

(56) References Cited

U.S. PATENT DOCUMENTS

| | | | |
|---|---|---|---|
| 2009/0089417 A1* | 4/2009 | Giffin | H04L 51/04 709/224 |
| 2011/0191097 A1* | 8/2011 | Spears | G06F 16/9535 704/9 |
| 2011/0289432 A1* | 11/2011 | Lucas | G06F 16/958 715/753 |
| 2012/0036147 A1* | 2/2012 | Borst | H04L 51/12 707/769 |
| 2012/0278253 A1* | 11/2012 | Gahlot | G06Q 30/0201 705/347 |
| 2014/0172989 A1* | 6/2014 | Rubinstein | H04L 51/32 709/206 |
| 2014/0188457 A1* | 7/2014 | Fink | G06F 17/2785 704/9 |
| 2015/0309987 A1* | 10/2015 | Epstein | G06F 17/2765 704/9 |
| 2016/0294753 A1* | 10/2016 | Centner | H04L 51/12 |
| 2016/0307114 A1* | 10/2016 | Ghosh | G06F 17/2785 |
| 2017/0061248 A1* | 3/2017 | Ryan, Jr. | G06K 9/6257 |
| 2017/0142044 A1* | 5/2017 | Ball | G06F 16/23 |
| 2018/0152402 A1* | 5/2018 | Tsou | H04L 51/12 |

* cited by examiner

INTELLIGENT CONTENT DETECTION

FIELD

The subject matter describes an automated system and method for text analytics, particularly the subject matter relates to programs for detecting an inappropriate word or phrase and performing an action responsive to the identification.

BACKGROUND

Users interface with other users using text-based mediums and/or applications. As an example, users may post comments on social media sites or create blogs or other text-based postings. As another example, games may include conversation windows or text messaging applications allowing communication between users or applications may provide group chat sessions or chat rooms. Additional examples include customer service representatives communicating with customers using chat or communication window interfaces, users interacting with a virtual assistant using text-based communication windows, and the like. When users get frustrated, angry, or are otherwise rude, the user may input rude or inappropriate content using the text-based medium.

Some applications provide a system that can detect obscene words or phrases and takes steps to correct or obscure the obscene words or phrases. These systems generally work by comparing the words or phrases to a dictionary or blacklist of words or phrases that have been identified as obscene by a user. In other words, a user or moderator must populate the dictionary or blacklist with the words or phrases that are considered obscene or unacceptable. This approach suffers from many different problems. First, while the system may automatically compare words against the dictionary or black list, a user has to manually update the dictionary, which is time consuming and can be error prone. Additionally, because a user updates the dictionary, there may be a significant time delay between when a word or phrase that is considered obscene is used, and when that word or phrase is added to the dictionary.

Additionally, once a word or phrase is added to the dictionary, users find a way to convey the same thought while skirting the dictionary rule. For example, instead of typing out the word or phrase correctly, a user may substitute symbols for particular letters (e.g., @ for a, ! for i, etc.), add extra letters by repeating letters, add extra spaces or characters between letters, abbreviate certain portions of the word, or the like. The moderator or dictionary updater then has to add these additional words or phrases to the dictionary before the system will recognize them as obscene. In other words, these systems are unable to identify variants of obscene words unless the variant is specifically identified and included in the dictionary or blacklist.

An additional problem with current techniques is that some words or phrases may not be obscene alone. However, in a particular context, the words or phrases may be considered rude, obscene, or inappropriate. For example, in a gaming environment where one team competes against another team, it may be considered rude to say that a game was easy, implying that the other team played poorly. However, most dictionaries would not consider "that was easy" to be obscene or even rude, even though it is rude in the gaming context. As another example, it may be considered obscene or rude for a customer service representative to tell a customer that it is the customer's fault that something is not correct or that the customer is dumb. However, conventional dictionaries would not understand or identify such text as obscene or rude.

BRIEF SUMMARY

In summary, an embodiment provides a system and method for detecting inappropriate content within a user interaction. The method may include receiving input from a user, analyzing the input, and determining whether at least a portion of the input includes inappropriate content by identifying the content as being previously categorized as inappropriate content or by analyzing responses from other users that are responsive to the input and determining that the responses of the other users indicate that the content is inappropriate.

An embodiment provides a method for detecting inappropriate content in user interactions, comprising: receiving an unstructured text-based input corresponding to a user interaction of a user; analyzing, using a text analytics technique, the text-based input to identify content within the input; determining whether at least a portion of the content within the input comprises inappropriate content; the determining comprising: determining if the at least a portion of the content is categorized as inappropriate content; if the at least a portion of the content is categorized as inappropriate content, identifying the at least a portion of the content as inappropriate content; and if the at least a portion of the content is not categorized as inappropriate content, receiving text-based input from other users responsive to the text-based input of the user, analyzing the text-based input from other users to determine a sentiment of the text-based input from other users, generating a content score for the at least a portion of the content of the user, and identifying the at least a portion of the content as inappropriate content based upon comparing the content score to a predetermined threshold; and performing, responsive to identifying at least a portion of the content as inappropriate content, an action.

An additional embodiment provides a system for detecting inappropriate content in user interactions, the system comprising: at least one processor; a memory device that stores instructions executable by the at least one processor to: receive an unstructured text-based input corresponding to a user interaction of a user; analyze, using a text analytics technique, the text-based input to identify content within the input; determine whether at least a portion of the content within the input comprises inappropriate content; the determining comprising: determining if the at least a portion of the content is categorized as inappropriate content; if the at least a portion of the content is categorized as inappropriate content, identifying the at least a portion of the content as inappropriate content; and if the at least a portion of the content is not categorized as inappropriate content, receiving text-based input from other users responsive to the text-based input of the user, analyzing the text-based input from other users to determine a sentiment of the text-based input from other users, generating a content score for the at least a portion of the content of the user, and identifying the at least a portion of the content as inappropriate content based upon comparing the content score to a predetermined threshold; and perform, responsive to identifying at least a portion of the content as inappropriate content, an action.

A further embodiment provides a product for detecting inappropriate content in user interactions, the product comprising: a storage device that stores code, the code being executable by the processor and comprising: code that receives an unstructured text-based input corresponding to a user interaction of a user; code that analyzes, using a text analytics technique, the text-based input to identify content within the input; code that determines whether at least a portion of the content within the input comprises inappropriate content; the determining comprising: determining if the at least a portion of the content is categorized as inappropriate content; if the at least a portion of the content is categorized as inappropriate content, identifying the at least a portion of the content as inappropriate content; and if the at least a portion of the content is not categorized as inappropriate content, receiving text-based input from other users responsive to the text-based input of the user, analyzing the text-based input from other users to determine a sentiment of the text-based input from other users, generating a content score for the at least a portion of the content of the user, and identifying the at least a portion of the content as inappropriate content based upon comparing the content score to a predetermined threshold; and code that performs, responsive to identifying at least a portion of the content as inappropriate content, an action.

Additional embodiments are described, including other methods, as well as devices/apparatuses, systems including multiple devices, and products.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
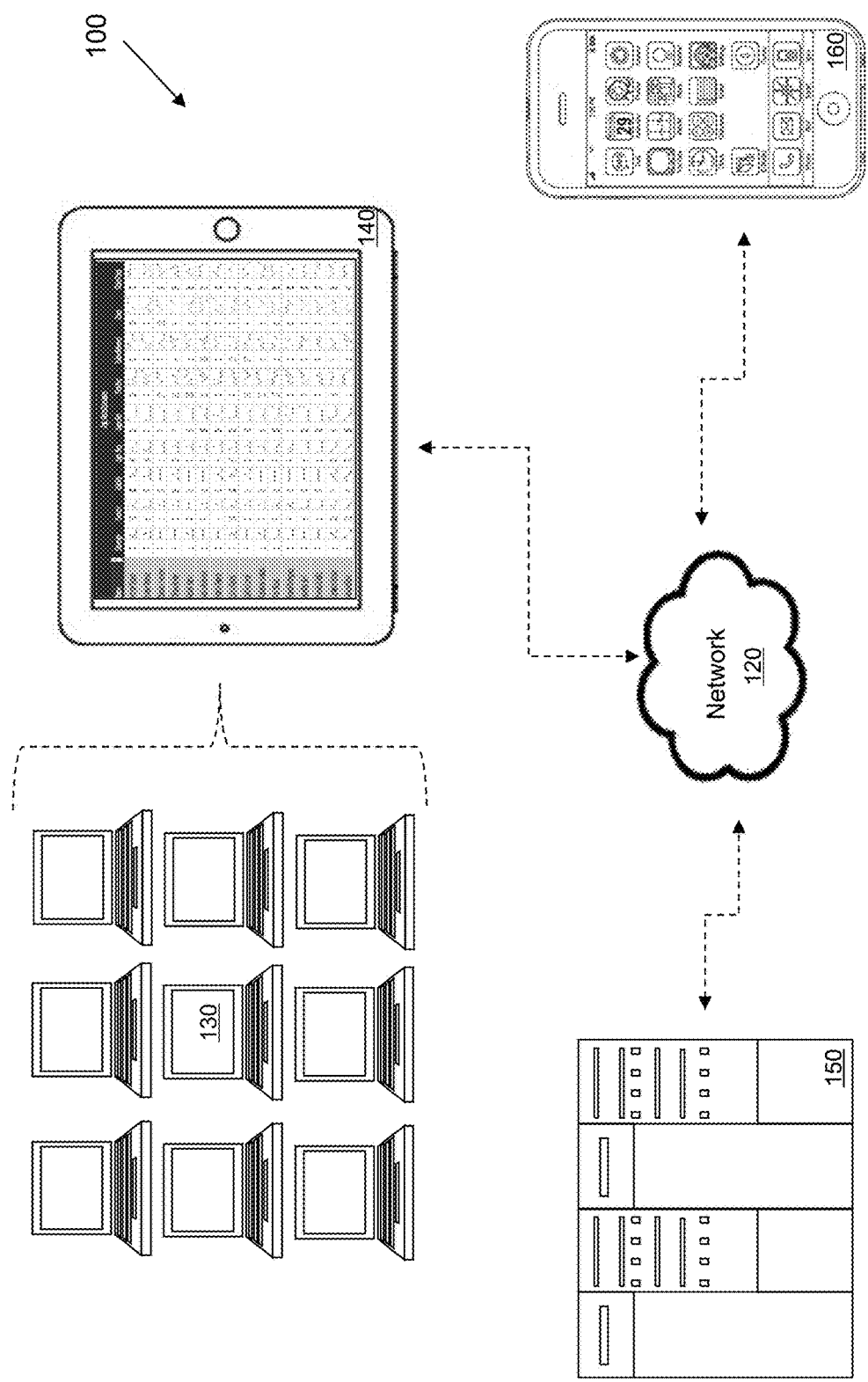
FIG. 1 illustrates an example system for intelligent content detection.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

An embodiment provides a system and method that facilitates detection of inappropriate content using a technique that can automatically detect the inappropriate content and flag or mark the content as inappropriate, without a user having to update a dictionary or blacklist to include the inappropriate content. Such a system also allows the inappropriate content to be identified based upon context. In other words, even if in one context the content may not be considered inappropriate, the system may identify it as inappropriate in a different context.

The example that will be used here throughout is a customer service context or a professional environment. In the customer service context or professional environment, it should be understood that content may be considered inappropriate even if, in a different context, the content would not be considered inappropriate. Therefore, it should be understood that the system as used herein can be used for different contexts and get different results (i.e., content being considered inappropriate for one context while not inappropriate for another context). However, it should be understood that the method and technique for determining the inappropriate content is applicable to many different applications and contexts and would identify the content that is inappropriate for the context that the system is used within.

To determine if content is inappropriate, the system may receive an input including a text-based input from one or more users. For example, a customer service representative may be interacting with a customer using a text-based communication application, for example, an instant messaging application or chat window on a website. The system may receive both the text-based input from the customer and the customer service representative. The system may then analyze the text-based input using one or more text-analysis techniques. Based upon the analysis, the system may identify one or more portions of the content (e.g., characters, words, phrases, sentences, etc.) and determine if that portion is inappropriate content. The system may first determine if the content has been previously categorized as inappropriate content, for example, whether the content is in an inappropriate content dictionary.

If the content has not been previously categorized as inappropriate content, the system may capture input from one or more other users that is responsive to the input of the primary user. Using the example above, the system may capture input from the customer service representative that is responsive to the input provided by the customer. The system may then analyze the content provided by the second user to determine a sentiment expressed by the other users. Based upon the sentiment or response by the second user, the system may score the content of the first user. If the content score, as compared to a predetermined threshold, indicates that the content is inappropriate the system may mark the content as inappropriate. The system may then perform some action responsive to identifying content as inappropriate, for example, masking the inappropriate content, deleting the inappropriate content, replacing the inappropriate content, notifying another user of the inappropriate content, adding the inappropriate content to a content dictionary, or the like.

The description now turns to non-limiting example embodiments of systems, methods, and products, as applied to an inappropriate content detection system.

Referring to FIG. 1, there is shown a system 100 for detecting inappropriate content that is able to support multiple distributed networked centers in accordance with an embodiment of the present invention. The system 100 is preferably comprised of a communication network 120, a call center 130, a management terminal 140, servers 150, and mobile device 160. Terminal 140 is operable to track and manage call center 130 and provide communications to and from servers 150 and device 160.

Figure 2:
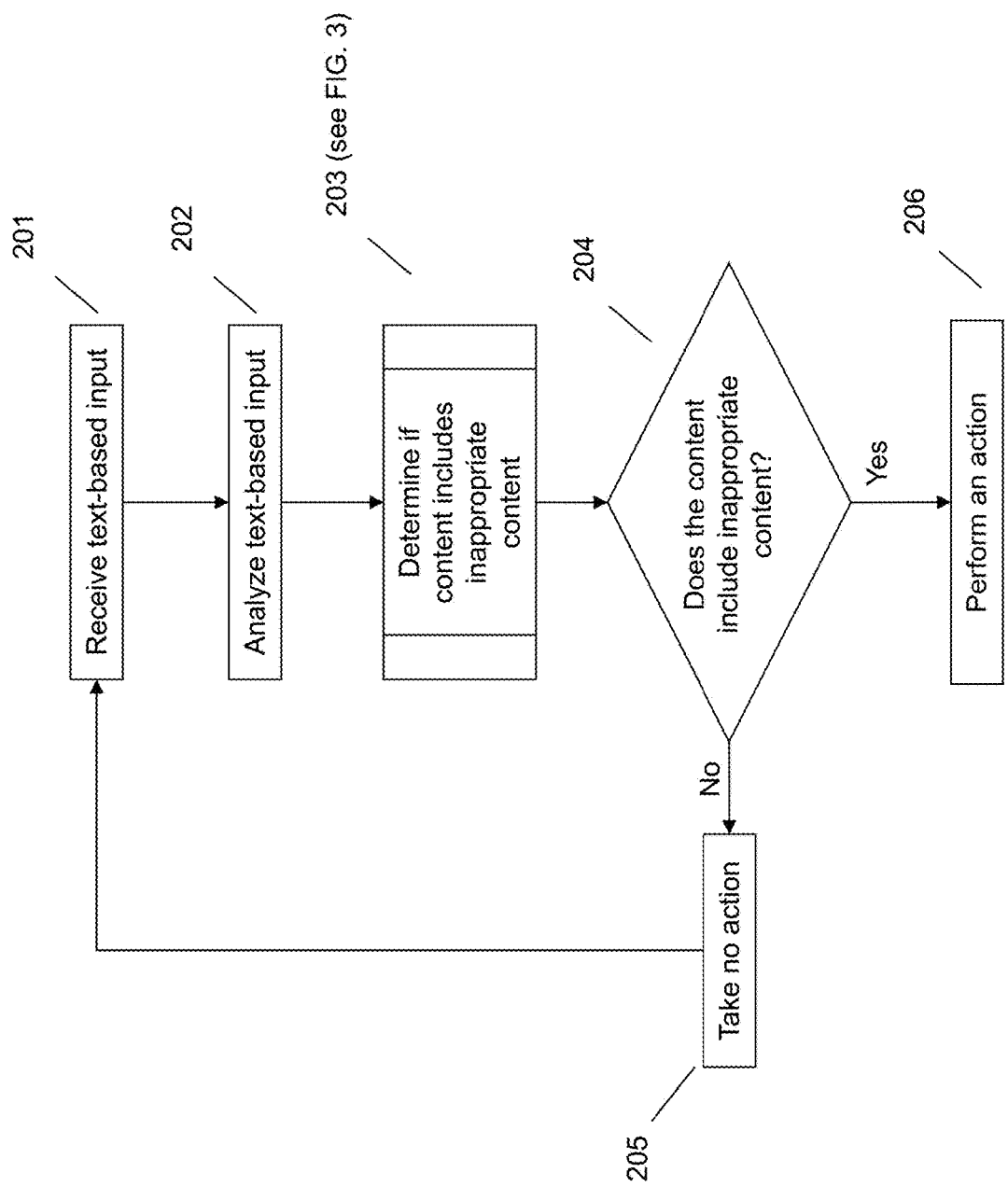
FIG. 2 illustrates a flow diagram of an example method of intelligent content detection according to an embodiment.

Referring to FIG. 2, at 201, the system may receive an unstructured text-based input corresponding to a user interaction of a user. Receipt of the unstructured text-based input may include capturing input as it is provided to another user. For example, the system may be stored locally or otherwise accessible by a computer of a customer service representative. As the customer service representative receives input, for example, from a customer, the system may also receive the input. Similarly, as the customer service representative provides input to the customer, the system may also receive the input provided by the representative. Receiving the input may also include obtaining the input from another source. For example, the input may be stored on a third-party site, and the system may mine the data. As an example, if the input is provided on a social media site, the system may mine the social media site to obtain the input. Obtaining the input may also include accessing a data storage location. For example, if communications between users is copied and stored in a data storage location, the system may access that data storage location. These are merely examples and receiving input can be performed using a variety of techniques.

Unstructured text input indicates that the text input is not provided in a pre-defined manner. In other words, the unstructured text input does not have a pre-defined data model, attribute, or input structure. The unstructured text can be provided in any form without a particular format or data structure that is required for input of the data. An example of a structured text-based input is data provided in a form, where each field of the form indicates the type of data that is being provided within that field (e.g., date field, name field, etc.). Unstructured data, on the other hand, is usually provided in a free-form text input area that does not define the data structure, format, or type of data that is being received. An example of an unstructured data field includes a comment section on a form, which allows a user to provide whatever text data that the user wants to provide. Other types of unstructured data input areas include communication windows, social media posting areas (e.g., blogs, social media pages, etc.), comment areas, review areas, and the like. Communication applications (e.g., instant messengers, chat windows, virtual assistant interfaces, etc.) generally include unstructured text.

A user interaction may include any act by a user that may result in another user seeing or otherwise accessing the input. In other words, the user may merely provide a social media posting that is not directed at a particular individual, and that constitutes a user interaction because another user could access the post and read the post. Accordingly, the user interaction may include a comment provided by a user on a social media forum (e.g., blog, social media website, etc.). Other examples of this type of user interaction include, a user providing a review on a product website, a user providing a comment on a company forum, and the like.

A user interaction may also include a user directly interacting with another user, for example, in a text-based interactive session with another user (e.g., using a chat application embedded in a website, a chat application associated with an application, instant messaging application, etc.), an interactive session with virtual assistant application (e.g., virtual troubleshooting application, virtual customer service application, etc.), and the like. As an example, a gaming application may provide a chat window that allows players to communicate with each other. As another example, a company may provide an instant messaging or chat application that allows employees to communicate with other employees or customers.

At 202 the system may analyze the text-based input to identify content within the input. Analyzing the input may include using one or more text analytics techniques to identify characters, words, phrases, sentences, and the like, included within the input. Additionally, the text analytics techniques may assist in identifying the context or structure of the content. For example, the text analytics technique(s) may identify a syntax associated with the input and may also identify semantics of portions of the input. One text analytics technique may include natural language processing to parse and identify content within the input. The text analytics technique may also include tokenizing the text-based input. Tokenizing the text-based input includes identifying different portions of the content and then marking the portion with the underlying structure. As an example, tokenizing may include identifying a word or phrase as a modifier, and another word or phrase within the sentence as the modified portion.

Using text analytics, the system may also annotate content with polite and rude annotators. For example, the system may identify certain words as polite (e.g., thank you, good, wonderful, etc.) and may identify certain words as rude (e.g., hate, idiot, dumb, crazy, etc.). As explained before, certain words or phrases may be identified as polite or rude in one context, while being identified as neutral or the opposite in a different context. As an example, the phrase "that was easy" may be rude in a gaming application because it implies that the other team played poorly, whereas the phrase "that was easy" in a customer service context may be polite or good because it indicates that the process for accomplishing something was easy and painless.

Figure 3:
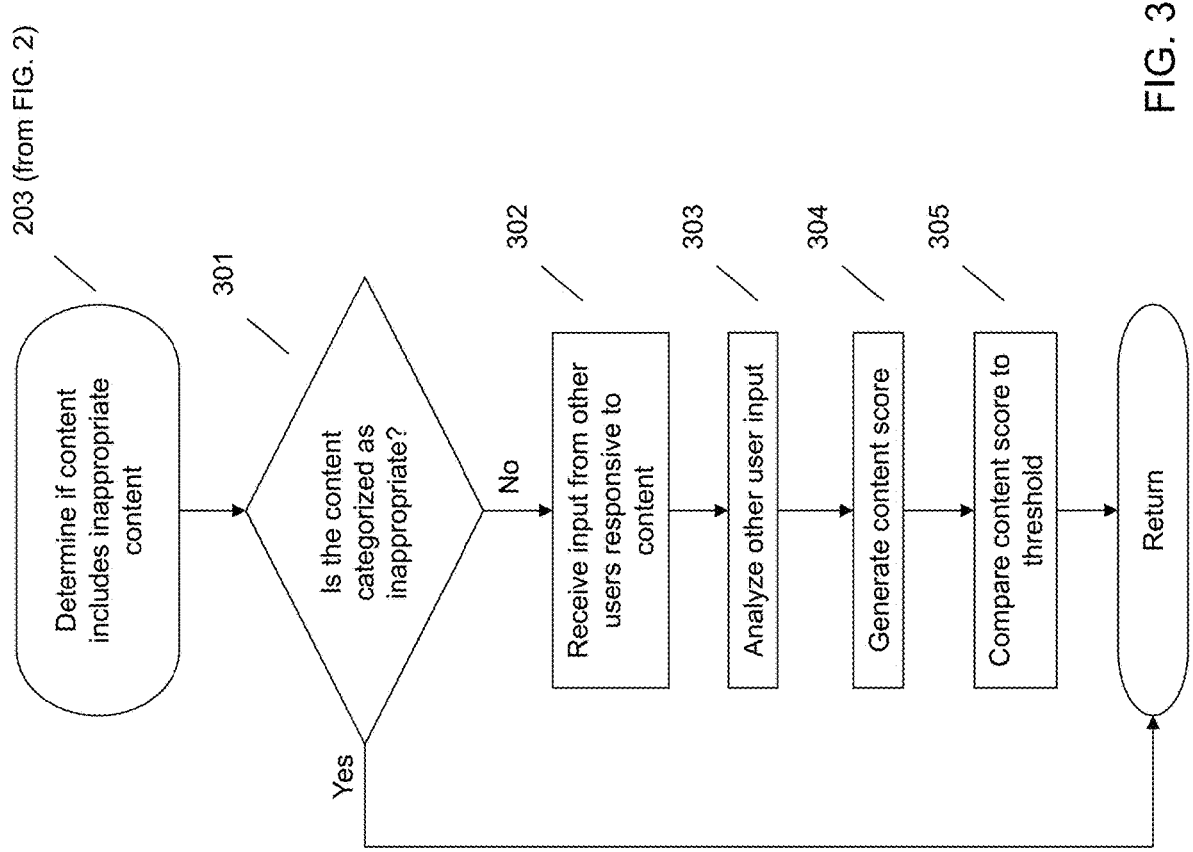
FIG. 3 illustrates a flow diagram of an example method of determining whether content is inappropriate according to an embodiment.

At 203, the system may then determine whether at least a portion of the content includes inappropriate content, with reference to FIG. 3. It should be understood that the entirety of the input does not have to be considered inappropriate to actually be inappropriate. For example, a customer could provide a few sentences of input and only one or two words may be considered inappropriate. Thus, the system may analyze the input by portions, for example, word-by-word, as phrase chunks, or the like. In order to determine if the content includes inappropriate content, the system may first determine if the portion of the content is categorized as inappropriate at 301. One technique for determining if the content has been previously categorized as inappropriate is by comparing the portion of the content to a blacklist or dictionary that includes content that has been identified as inappropriate. Another technique may include identifying the token or annotator that has been assigned to the portion of the content. For example, if the token or annotator identifies the content as rude or otherwise inappropriate, the system may identify that the content has been categorized as inappropriate. If the content has previously been categorized as inappropriate, the system may return to block 204 of FIG. 2 as explained in more detail below.

If, however, the content has not been categorized as inappropriate at 301, the system may use machine learning techniques to determine if the content is inappropriate. In order to reduce processing power, the system may only try to determine if the content is inappropriate when the system does not recognize the input, for example, because a user has replaced particular characters with other characters, added additional characters, or otherwise attempted to circumvent the content system. In other words, if the system can recognize the word or phrase and that word or phrase has not been previously categorized as inappropriate, the system may assume that the content is appropriate and take no further action. However, since some content in a particular context may be identified as inappropriate while being identified as appropriate in a different context, the system may perform the following steps even if the system does recognize the text input.

If the content has not been previously categorized as inappropriate, the system may receive text-based input from other users at 302, for example, using any of the techniques as discussed above in connection with 201. This text-based input of other users may be responsive to the input of the first user. For example, the first user may have posted something on a social media site, and other users may have commented on the post. As another example, the first user may have provided text in a chat application and a second user may respond to the first user. To enhance readability, the term second user will be used, however, it should be understood that more than one user may be respond to the input of the first user and the system may use the responses of all the users to make the determination of whether the content is inappropriate.

The system, at 303, may analyze the input from the other users to determine a sentiment or opinion from the second user regarding the input of the first user. The system may use one or more of the text analytics techniques as discussed above with respect to 202. To determine the sentiment or opinion of the second user, the system may analyze the content of the second user's input to determine how the second user is responding to the input of the first user. In other words, the system determines if the response to the first user's input is negative, neutral, or positive. If the responses are negative, the system may determine that the content may be inappropriate. As an example, if a first user provides input that is inappropriate, a second user may provide input such as "that was not very nice", "that was rude", or other input that may itself be inappropriate. In other words, when a user sees input that is inappropriate, the user may respond to the inappropriate content negatively or in an inappropriate way.

The system may use the input of the second user to generate a content score for the input of the first user at 304. The content score may be used to determine if the content is truly inappropriate. For example, a first user may provide input that is not actually inappropriate, but a second user may respond negatively or inappropriately in response. In order to prevent false positives, the system may generate a content score that gets updated when the content is seen again or based upon additional inputs from users in response to the original content. For example, if the first user provides inappropriate content and a second user responds negatively to that inappropriate content, the content score may be updated to reflect that the input of the first user is trending inappropriate. If additional users respond to the first input negatively, then the content score may again be updated to indicate a higher probability that the content is inappropriate.

The system may also identify users who always or almost always respond in a positive manner even when inappropriate content is provided. The system may then ignore responses from those users when attempting to determine if the content is inappropriate. In other words, if a user always responds positively, the system does not want to use this input to score the content because it introduces a positive bias into whether the content is inappropriate.

The content score may be any type of score. For example, neutral content may be considered a "0" on a scale, appropriate content may be considered anything positive on that scale, and negative may be considered anything negative on the scale. The more negative the score for content, the more likely the content should be considered inappropriate. Alternatively, the content may be scored using words (e.g., "highly inappropriate", "neutral", "slightly appropriate", etc.), on a sliding scale, or the like. In other words, any type of scoring system may be used and may be different for different applications or contexts. An example of generating a content score of a new term is as follows:

$$NewTermScore = \frac{(CurrentAvg * NumofResponses) + NewResponseScore1\left(\frac{1}{|userscore1|}\right) + NewResponseScore2\left(\frac{1}{|userscore2|}\right) + \ldots}{NumofResponses + \left(\frac{1}{|userscore1|}\right) + \left(\frac{1}{|userscore2|}\right) + \ldots}$$

In this example, the current average or current score of the term is multiplied by the number of other user responses that have been received in response to the input. As new responses are identified, the system identifies the score of the new response and multiplies it by one over the score of the user providing the response. Each of the new responses is added to the product of the current average and the number of user responses. This result is then divided by the summation of the number of responses and one over the user scores. Identification and generation of the user scores will be discussed in more detail below.

As the content score is generated and updated, the system may compare the score to a predetermined threshold at 305, where the threshold indicates when content is considered inappropriate. The predetermined threshold may be set by a user or may be a default setting. For example, using one of the scoring systems described above as an example, the system may identify content as inappropriate when the score reaches or exceeds −25. If the content score reaches the threshold indicating the content as inappropriate, the dictionary or categorization database may be updated to include the content as inappropriate. In other words, if the content is provided again, the system may identify the content as previously being categorized as inappropriate at 301.

The system may then identify if the content includes inappropriate content at 204. If the system identifies that no inappropriate content is found, for example, the content score has not met the predetermined threshold, the system may take no action at 205. If, however, the system identifies that inappropriate content has been found, either because the content was categorized as inappropriate at 301 or because the content score has reached or matches the predetermined threshold, the system may perform an action at 206. Performing an action may include masking the inappropriate content (e.g., replacing the content with other characters, hiding the content, overlaying the content with a graphic, etc.), deleting the inappropriate content, replacing the inappropriate content with a sentence stating it was removed as inappropriate, replacing the inappropriate content with appropriate content, or the like.

Performing an action may also include notifying another user of the inappropriate content. Using our customer service representative example, if the customer service representative or customer has been identified as providing inappropriate content, a manager or other user may be notified. For example, if the representative is the one providing the inappropriate content, a manager of the representative may be notified so that corrective action may be taken. As another example, if the customer is the one providing the inappropriate content, a manager may be notified in order to intervene and address the content of the customer.

In addition to identifying and scoring inappropriate content, the system may also score the user. For example, as the user provides content, the system may score the user in a manner which identifies the user as a person who routinely provides inappropriate content or as a user who generally does not provide inappropriate content. In order to generate an accurate score, the score may be updated every time content is provided by the user. In other words, after a user provides input, the system may update the score associated with the user. An example for calculating the user score is as follows:

$$NewUserScore = \frac{(CurrentAvg * NumofResponses) + NewResponseScore1 + NewResponseScore2 \ldots}{NumofResponses + NumofNewResponses}$$

In this example calculation, the current average or current user score is multiplied by the number of responses provided by that user. As the user provides new responses, the scores of the new responses are added to the product of the current average and previous number of responses. This result is then divided by the sum of the number of total responses and the number of new responses provided by the user.

As the user is scored, the system may compare this user score to a threshold and may take an action if the score reaches a particular threshold. For example, if the system identifies a particular user as one who routinely provides inappropriate content, the system may take action to prevent the user from being able to provide content at all. As another example, if the system identifies a customer as one who routinely provides inappropriate content, the system may direct the customer to a representative who routinely responds appropriately to inappropriate content. In other words, the system may assign difficult customers to representatives who are very polite even in view of inappropriate content or it may even assign the customer to a manager or other higher level employee.

Figure 4:
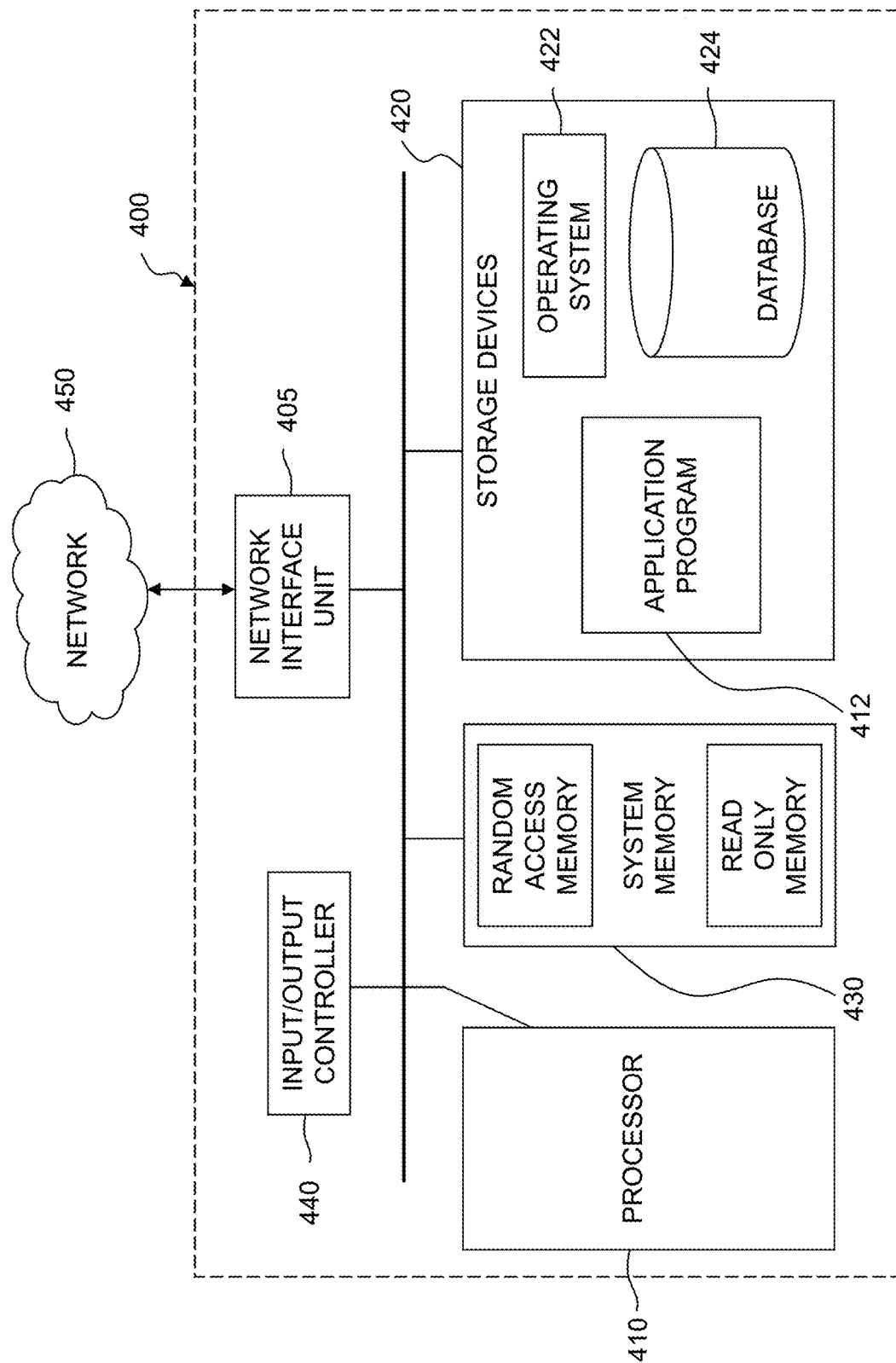
FIG. 4 illustrates an example device for intelligent content detection.

FIG. 4 illustrates an example device according to an embodiment, e.g., a call center employee's desktop computing device. In the example of FIG. 4, storage devices 420 includes software such as a workflow graphical user interface application program 412 that may be run or executed by processor(s) 410 according to an operating system 422. The circuitry 400 provides that the processor 410 loads the operating system 422 and thereafter the application program 412, e.g., into memory 430.

System 400 typically includes a network interface 405 facilitating communications with other devices, e.g., a connection to other devices over a network 450 using components such as a WWAN transceiver, a WLAN transceiver or a wired connection, e.g., a LAN connection. Commonly, system 400 will include an input/output controller 440 for data input and display. System 400 typically includes various memory 430 and storage devices 420, for example a database 424, e.g., for storing data from internal and external data sources, referred to herein.

Device circuitry, as for example outlined in FIG. 4, may be used to generate, manage, and process data collected during the operation of the program providing a graphical user interface for workflow. It will also be apparent that circuitry other than the non-limiting example outlined in FIG. 4 may be used.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., nearfield communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of an information handling device or other programmable data processing device to produce a machine, such that the instructions, which execute via a processor of the device, implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for detecting inappropriate content in user input into a text-based communication application, the method comprising:
   receiving an unstructured text-based input provided by a user into a text-based communication application accessed by at least one other user;
   analyzing, using a text analytics technique, the unstructured text-based input to identify content within the unstructured text-based input, wherein the analyzing comprises annotating the content with sentiment annotators, wherein a sentiment of the sentiment annotators is based upon the text-based communication application;
   determining at least a portion of the content within the unstructured text-based input comprises inappropriate content;
   the determining comprising:
      determining the at least a portion of the content is not previously categorized as inappropriate content, wherein the determining the at least a portion of the content is not previously categorized comprises identifying a sentiment annotator corresponding to the at least a portion does not reflect an inappropriate sentiment; and
      receiving text-based input from other users that is responsive to the unstructured text-based input of the user, analyzing the text-based input from other users to determine a sentiment of the text-based input from other users, generating, based upon the sentiment of the text-based input from other users, a content score for the at least a portion of the content, and identifying the at least a portion of the content as inappropriate content based upon comparing the content score to a predetermined threshold; and
   performing, responsive to identifying at least a portion of the content as inappropriate content, an action, wherein the performing an action comprises at least performing an action on the at least a portion of the content.

2. The method of claim 1, wherein the performing an action on the at least a portion of the content is an action selected from the group consisting of: masking the inappropriate content and deleting the inappropriate content.

3. The method of claim 1, wherein the performing an action further comprises notifying another user of the inappropriate content.

4. The method of claim 1, further comprising generating a score associated with a user based upon historical text-based inputs provided by the user, wherein the scoring identifies a user rating related to an appropriateness of content provided by the user.

5. The method of claim 4, further comprising updating the score associated with the user subsequent to receiving text-based input associated with the user.

6. The method of claim 1, wherein the unstructured text-based input comprises a comment provided by the user on a social media forum.

7. The method of claim 1, wherein the analyzing the unstructured text-based input comprises parsing and tokenizing the unstructured text-based input.

8. The method of claim 1, wherein the determining if the at least a portion of the content is not previously categorized as inappropriate content comprises comparing the at least a portion of the content to an inappropriate content dictionary.

9. The method of claim 1, wherein the analyzing the unstructured text-based input comprises annotating the content with polite and rude annotators.

10. The method of claim 1, wherein the unstructured text-based input comprises input into at least one of a text-based interactive session with a virtual agent and a text-based interactive session with another user.

11. A system for detecting inappropriate content in user input into a text-based communication application, the system comprising:
    at least one processor;
    a memory device that stores instructions executable by the at least one processor to:
    receive an unstructured text-based input provided by a user into a text-based communication application accessed by at least one other user;
    analyze, using a text analytics technique, the unstructured text-based input to identify content within the unstructured text-based input, wherein the analyzing comprises annotating the content with sentiment annotators, wherein a sentiment of the sentiment annotators is based upon the text-based communication application;
    determine at least a portion of the content within the unstructured text-based input comprises inappropriate content;
    the determining comprising:
       determining the at least a portion of the content is not previously categorized as inappropriate content, wherein the determining the at least a portion of the content is not previously categorized comprises identifying a sentiment annotator corresponding to the at least a portion does not reflect an inappropriate sentiment; and
       receiving text-based input from other users that is responsive to the unstructured text-based input of the user, analyzing the text-based input from other users to determine a sentiment of the text-based input from other users, generating, based upon the sentiment of the text-based input from other users, a content score for the at least a portion of the content of the user, and identifying the at least a portion of the content as inappropriate content based upon comparing the content score to a predetermined threshold; and
    perform, responsive to identifying at least a portion of the content as inappropriate content, an action, wherein the performing an action comprises at least performing an action on the at least a portion of the content.

12. The system of claim 11, wherein the performing an action on the at least a portion of the content is an action selected from the group consisting of: masking the inappropriate content and deleting the inappropriate content.

13. The system of claim 11, wherein the performing an action further comprises notifying another user of the inappropriate content.

14. The system of claim 11, further comprising generating a score associated with a user based upon historical text-based inputs provided by the user, wherein the scoring identifies a user rating related to an appropriateness of content provided by the user.

15. The system of claim 14, further comprising updating the score associated with the user subsequent to receiving text-based input associated with the user.

16. The system of claim 11, wherein the analyzing the unstructured text-based input comprises parsing and tokenizing the unstructured text-based input.

17. The system of claim 11, wherein the determining if the at least a portion of the content is not previously categorized as inappropriate content comprises comparing the at least a portion of the content to an inappropriate content dictionary.

18. The system of claim 11, wherein the analyzing the unstructured text-based input comprises annotating the content with polite and rude annotators.

19. The system of claim 11, wherein the unstructured text-based input comprises input into at least one of a text-based interactive session with a virtual agent and a text-based interactive session with another user.

20. A product for detecting inappropriate content in user input into a text-based communication application, the product comprising:
   a storage device that stores code, the code being executable by a processor and comprising:
   code that receives an unstructured text-based input provided by a user into a text-based communication application accessed by at least one other user;
   code that analyzes, using a text analytics technique, the unstructured text-based input to identify content within the unstructured text-based input, wherein the code that analyzes comprises code that annotates the content with sentiment annotators, wherein a sentiment of the sentiment annotators is based upon the text-based communication application;
   code that determines at least a portion of the content within the unstructured text-based input comprises inappropriate content;
   the determining comprising:
      determining the at least a portion of the content is not previously categorized as inappropriate content, wherein the determining the at least a portion of the content is not previously categorized comprises identifying a sentiment annotator corresponding to the at least a portion does not reflect an inappropriate sentiment; and
      receiving text-based input from other users that is responsive to the unstructured text-based input of the user, analyzing the text-based input from other users to determine a sentiment of the text-based input from other users, generating, based upon the sentiment of the text-based input from other users, a content score for the at least a portion of the content, and identifying the at least a portion of the content as inappropriate content based upon comparing the content score to a predetermined threshold; and
   code that performs, responsive to identifying at least a portion of the content as inappropriate content, an action, wherein the code that performs an action comprises at least performing an action on the at least a portion of the content.

* * * * *